US005800844A

United States Patent [19]
Raio et al.

[11] Patent Number: 5,800,844
[45] Date of Patent: Sep. 1, 1998

[54] DOUGH PRESS MACHINE

[75] Inventors: Eugene Louis Raio, Huntington Beach; Steven M. Raio, Yorba Linda, both of Calif.

[73] Assignee: Proprocess Corporation, Paramount, Calif.

[21] Appl. No.: 777,485

[22] Filed: Dec. 30, 1996

[51] Int. Cl.$^6$ ................................................ B30B 15/14
[52] U.S. Cl. ........................ 425/150; 99/432; 425/167; 425/408
[58] Field of Search .......................... 425/116, 149, 425/150, 167, 214, 408, 409; 99/349, 353, 432

[56] References Cited

U.S. PATENT DOCUMENTS

| | | | |
|---|---|---|---|
| 3,565,015 | 2/1971 | Jorgensen | 100/93 R |
| 3,844,701 | 10/1974 | Rockwell | 425/348 |
| 5,147,661 | 9/1992 | Kurumaji et al. | 425/150 |
| 5,156,782 | 10/1992 | Ballantyne | 425/149 |
| 5,282,732 | 2/1994 | Eggert | 425/153 |
| 5,469,779 | 11/1995 | Amore et al. | 99/349 |

*Primary Examiner*—Patrick Ryan
*Assistant Examiner*—Iurie Schwartz
*Attorney, Agent, or Firm*—Stetina Brunda Garred & Brucker

[57] ABSTRACT

A dough press machine for flattening a quantity of dough usable as a crust for a food product such as a pizza pie. The machine has a vertically movable upper platen having a bottom surface and a lower platen having a top surface. The lower platen is movable from and to a position whereby the bottom surface of the upper platen and the top surface of the lower platen are substantially aligned with each other for vertical downward movement of the upper platen against the lower platen. The machine includes a sensor for detecting alignment of the lower platen with the upper platen such that the upper platen is vertically immovable when the lower platen is not in substantial alignment with the upper platen. Vertical movement of the upper platen is accomplished electromechanically with an electric thrust actuator in communication with the upper platen. Operation of the dough press machine provides for efficient product manufacture because of the pressing capacity of the upper platen, and for operator safety because of inoperability of the upper platen unless the lower platen is properly aligned with the upper platen for normal press operation. In this manner both product volume and worker protection are improved.

6 Claims, 1 Drawing Sheet

DOUGH PRESS MACHINE

FIELD OF THE INVENTION

The present invention relates in general to a dough press machine for flattening a quantity of dough, and in particular to a dough press machine having a vertically movable upper platen, a lower platen movable to a position substantially in alignment with the upper platen for vertical downward mating movement of the upper platen, and a sensor for detecting alignment of the lower platen with the upper platen such that the upper platen is inoperable when the upper and lower platens are not in substantial alignment.

BACKGROUND OF THE INVENTION

Dough press machines for the flattening of a quantity of dough in the formation of pie crusts to be used in the preparation of pizza pies for example, generally are constructed to include a press member having an upper platen and a lower platen in alignment with each other. A quantity of un-formed dough is placed either directly on the lower platen or on a carrier such as a pan which is placed on the lower platen. Thereafter, the upper platen is lowered onto the dough to thereby flatten and spread the dough laterally and form a shaped, non-cooked crust. The upper platen may or may not have an associated heating element to par bake the crust during crust formation.

To provide access to the lower platen for placement and removal of dough, the platen generally is movable, usually pivotally, from and to a site of vertical alignment with the upper platen. Thus, when dough is to be flattened, the lower platen is pivoted outwardly from beneath the upper platen and an operator places a mass of dough on the lower platen which is then returned to vertical alignment with the upper platen. Thereafter, the upper platen is activated to move downwardly against the lower platen to flatten the dough, and then is raised, with usual downward and upward platen movement accomplished either hydraulically or pneumatically. After dough flattening, the lower platen is again pivoted from beneath the upper platen, the flattened dough, now configured as a pie crust, is removed, and another dough mass is placed on the lower platen for flattening through repetition of the above cycle.

While prior art dough press machines produce adequate pie crust products, their efficiency and safety of operation can benefit from improvements. With respect to the former, hydraulic or pneumatic vertical movement of the upper platen against the lower platen provides an impact or linear load capacity of about 90 pounds. However, a linear load capacity as high as 1,000 pounds quickly produces a superior dough flattening. With respect to safety of operation, accidental vertical downward movement of the upper platen when the lower platen is not in alignment therewith can result in injury to an operator.

In view of the above-described deficiencies in the currently available configurations, it is apparent that a need is present for a dough press machine having greater working capacity as well as safety of operation. Accordingly, a primary object of the present invention is to provide a dough press machine whose press operation is accomplished electromechanically for greater impact efficiency.

A second primary object of the present invention is to provide a dough press machine wherein accidental or unexpected downward drive of the upper platen of the press cannot occur when the lower platen of the press is not in alignment with the upper platen.

These and other objects of the present invention will become apparent throughout the description thereof which now follows.

SUMMARY OF THE INVENTION

The present invention is a dough press machine for flattening a quantity of dough usable as a crust for a food product such as a pizza pie. The machine comprises a vertically movable upper platen having a bottom surface and a lower platen having a top surface. The lower platen is movable from and to a position whereby the bottom surface of the upper platen and the top surface of the lower platen are substantially aligned with each other for vertical downward movement of the upper platen against the lower platen. The machine includes a sensor for detecting alignment of the lower platen with the upper platen such that the upper platen is vertically immovable when the lower platen is not in substantial alignment with the upper platen. Vertical movement of the upper platen preferably is accomplished electromechanically with an electric thrust actuator in communication with the upper platen. Most preferably, the thrust actuator has the capacity to drive the upper platen with a force equivalent to a linear load capacity of about 1,000 pounds.

Operation of the dough press machine provides for efficient product manufacture because of the pressing capacity of the upper platen, and for operator safety because of inoperability of the upper platen unless the lower platen is properly aligned with the upper platen for normal press operation. In this manner both product volume and worker protection are improved.

BRIEF DESCRIPTION OF THE DRAWINGS

An illustrative and presently preferred embodiment of the invention is shown in the accompanying drawings in which.

DETAILED DESCRIPTION OF THE PREFERRED EMBODIMENT

Figure 1:
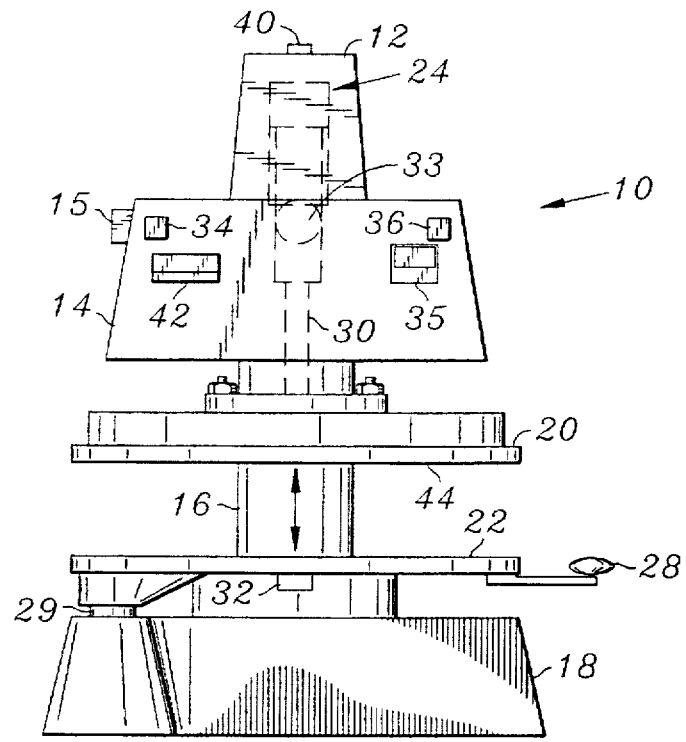
FIG. 1 is a front elevation view of a dough press machine.
Figure 2:
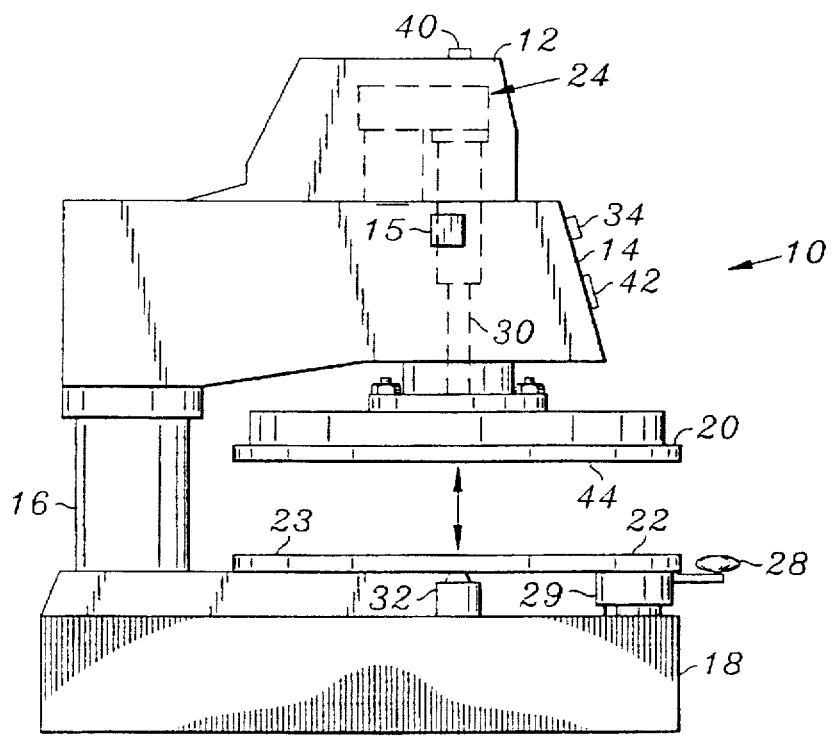
FIG. 2 is a side elevation view of the dough press machine of FIG. 1.

Referring to FIGS. 1 and 2, a dough press machine 10 is shown. The machine 10 has a housing comprising an upper compartment 12, a control panel 14, a support post 16, and a base 18. The machine 10 includes a heated upper platen 20 and lower platen 22, with the upper platen 20 attached to an electric thrust actuator 24 activated by two external press motion activator switches 34, 36 that must be engaged simultaneously. A preferred thrust actuator 24 is an Electrak 5 DC actuator, Model No. D9010B5-04, available from Dana Corporation, Warner Electric Division, Marenco, Ill., and having a linear load capacity of about 1,000 pounds. In particular, the upper platen 20 is connected centrally to a reciprocating shaft 30 of the actuator 24 that sequentially extends from and retracts toward the compartment 12 in which is housed the actuator motor. Vertical movement of the upper platen 20 is controlled by the actuator 24 such that the platen 20 is driven to and from the lower platen 22 via the shaft 30 as required during operation. The machine 10 is provided with an emergency press termination switch 33 which, upon engagement, immediately stops machine activity.

The lower platen 22 is pivotally mounted to the base 18 such that it can be pivotally movable about a pivot site 29 from an outside site (whereat a substantial portion thereof extends outwardly from the base 18) to a position in alignment with the upper platen 22, as shown in FIGS. 1 and 2. The pivotal movement of the lower platen 22 is accomplished by manipulating the handle 28. Situated beneath the lower platen 22 is a conventional microswitch sensor 32 that is activated only when the lower platen 22 is pivotally in vertical alignment with the upper platen 20. The sensor 32 is in electrical communication with the actuator 24 such that operability of the actuator 24 is prohibited unless the sensor 32 is activated by the aligned position of the lower platen 22, thereby prohibiting accidental or unexpected movement of the upper platen 20 and resultant potential injury to an operator. Of course, a dough press machine where the upper platen is driven manually, hydraulically, or pneumatically, as opposed to electromechanically as in this preferred embodiment, can also include a sensor 32 and thereby reside within the scope of the present invention.

Operating the dough press machine 10 involves first powering the machine 10 by engaging the on/off switch 15 and activating the heating element of the upper platen 20 if needed to improve flow characteristics of cold dough. Temperature of the upper platen 20 is displayed on the digital temperature indicator 42 of the control panel 14. Thereafter, a quantity of dough (not shown) is placed on the top surface 23 of the lower platen 22 or on a tray (not shown) placed thereon and the lower platen 22 is pivotally moved to a position in alignment with the upper platen 20. An operator adjusts the thickness control knob 40 to thereby adjust the gap for dough thickness when the upper platen 20 and lower platen 22 are juxtaposed for pressing the dough, and then simultaneously engages press motion activator switches 34, 36 to power the actuator 24 and cause downward movement of the upper platen 20 such that the bottom surface 44 thereof impinges on the quantity of dough on the lower platen 22 for a programmable length of time (typically five to seven seconds) to cause the dough to flatten. Because the top surface 23 of the lower platen 22 and the bottom surface 44 of the upper platen 20 are substantially circular and planar, a flattened, generally circular non-cooked formed crust is produced. The upper platen 20 then returns to its original position and the lower platen 22 is pivotally moved outwardly to permit removal of the formed flattened crust for subsequent use in food preparation. The above steps are repeated a plurality of times until the desired number of crusts are produced. The machine 10 can be provided with a programmable press cycle timer operable through an exteriorly accessible timer switch 35 to accomplish repetition of the electromechanical steps.

As is evident from the above description, the present invention provides both efficiency in the production of formed pie dough and safety in such production. The electromechanical impact pressure of the preferred embodiment forms pressed-dough crust precursors rapidly and uniformly, while the lower-platen position sensor prohibits unexpected press movement by requiring positive operator placement of the lower platen in its operating position. While an illustrative and presently preferred embodiment of the invention has been described in detail herein, it is to be understood that the inventive concepts may be otherwise variously embodied and employed and that the appended claims are intended to be construed to include such variations except insofar as limited by the prior art.

What is claimed is:

1. A dough press machine for flattening a quantity of dough, the dough press machine comprising:

a housing;

a lower platen pivotally connected to the housing and movable between an operating position and an access position relative thereto;

a thrust actuator attached to the housing;

an upper platen attached to the thrust actuator and reciprocally moveable thereby toward and away from the lower platen, the upper platen being substantially aligned with the lower platen when the lower platen is in the operating position; and a sensor attached to the housing and electrically connected to the thrust actuator for detecting the position of the lower platen and the alignment thereof with the upper platen;

said sensor being operable to prevent the thrust actuator for moving the upper platen toward the lower platen when the lower platen is not in the operating position in substantial alignment with the upper platen.

2. The dough press machine of claim 1 wherein the lower and upper platens each have generally circular configurations and are in substantial coaxial alignment with each other when the lower platen is in the operating position.

3. The dough press machine of claim 2 wherein the lower platen defines a generally planar top surface and the upper platen defines a generally planar bottom surface.

4. The dough press machine of claim 1 wherein the thrust actuator is sized and configured to move the upper platen toward the lower platen with a force equivalent to a linear load capacity of about one thousand pounds.

5. The dough press machine of claim 1 wherein the lower platen defines a generally planar top surface and the upper platen defines a generally planar bottom surface.

6. A dough press machine for flattening a quantity of dough, the dough press machine comprising:

a lower platen pivotally movable between an operating position and an access position;

an upper platen reciprocally movable toward and away from the lower platen, said upper platen being substantially aligned with the lower platen when the lower platen is in the operating position; and a sensor operable to detect the position of the lower platen relative to the upper platen and prevent the upper platen for moving toward the lower platen when the lower platen is not in the operating position in substantial alignment with the upper platen.

* * * * *

REEXAMINATION CERTIFICATE (3958th)

United States Patent [19]
Raio et al.

[11] B1 5,800,844
[45] Certificate Issued Dec. 14, 1999

[54] DOUGH PRESS MACHINE

[75] Inventors: Eugene Louis Raio, Huntington Beach; Steven M. Raio, Yorba Linda, both of Calif.

[73] Assignee: Proprocess Corporation, Paramont, Calif.

Reexamination Request:
No. 90/005,320, Apr. 28, 1999

Reexamination Certificate for:
Patent No.: 5,800,844
Issued: Sep. 1, 1998
Appl. No.: 08/777,485
Filed: Dec. 30, 1996

[51] Int. Cl.$^6$ .............................. A21C 11/00; B30B 15/14
[52] U.S. Cl. .............................. 425/150; 99/432; 425/152; 425/167; 425/408
[58] Field of Search ...................................... 425/150, 152, 425/167, 394, 183, 408, 409; 99/432

[56] References Cited

U.S. PATENT DOCUMENTS 4,559,002  12/1985  Atwood ................................... 425/152
5,469,779  11/1995  Amore et al. ........................... 425/394

*Primary Examiner*—Robert Davis

[57] ABSTRACT

A dough press machine for flattening a quantity of dough usable as a crust for a food product such as a pizza pie. The machine has a vertically movable upper platen having a bottom surface and a lower platen having a top surface. The lower platen is movable from and to a position whereby the bottom surface of the upper platen and the top surface of the lower platen are substantially aligned with each other for vertical downward movement of the upper platen against the lower platen. The machine includes a sensor for detecting alignment of the lower platen with the upper platen such that the upper platen is vertically immovable when the lower platen is not in substantial alignment with the upper platen. Vertical movement of the upper platen is accomplished electromechanically with an electric thrust actuator in communication with the upper platen. Operation of the dough press machine provides for efficient product manufacture because of the pressing capacity of the upper platen, and for operator safety because of inoperability of the upper platen unless the lower platen is properly aligned with the upper platen for normal press operation. In this manner both product volume and worker protection are improved.

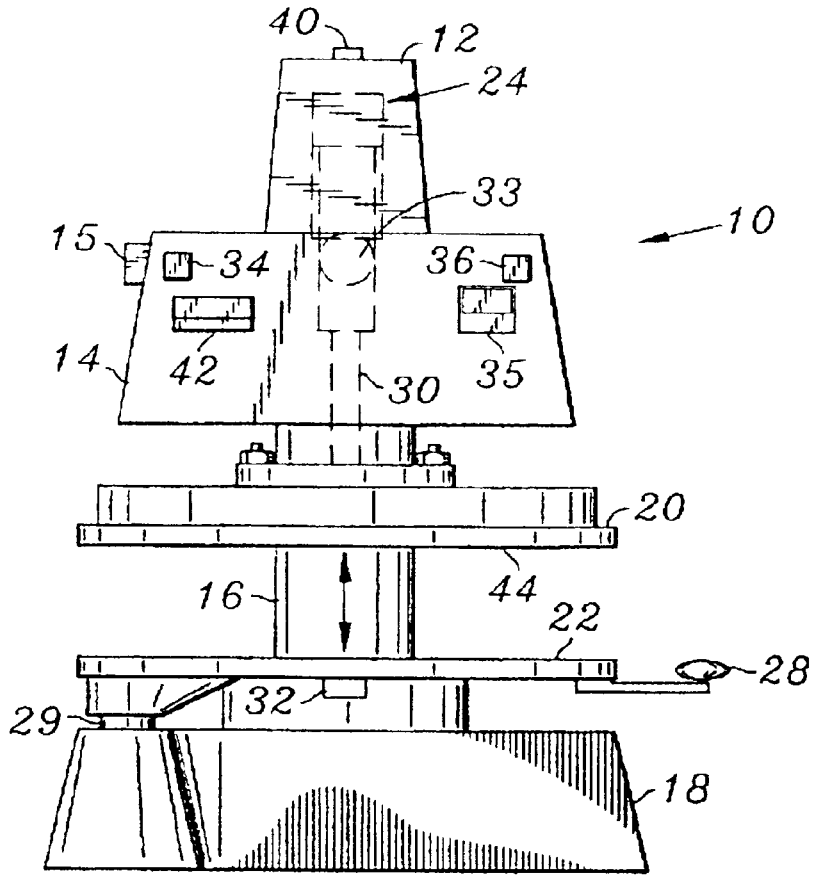

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1–6 are cancelled.

* * * * *